United States Patent [19]

Peek

[11] Patent Number: 5,481,706

[45] Date of Patent: Jan. 2, 1996

[54] SYSTEM AND METHOD FOR CREATING THREAD-SAFE SHARED LIBRARIES

[75] Inventor: Jeffrey S. Peek, Austin, Tex.

[73] Assignee: International Business Machines Corporation, Armonk, N.Y.

[21] Appl. No.: 143,586

[22] Filed: Nov. 1, 1993

[51] Int. Cl.⁶ ............................ G06F 13/00; G06F 15/16
[52] U.S. Cl. .......................... 395/650; 395/491; 395/472; 395/700; 364/245.3; 364/228; 364/228.1
[58] Field of Search .................................... 395/425, 375, 395/650, 700, 725; 364/200

[56] References Cited

U.S. PATENT DOCUMENTS

| | | | |
|---|---|---|---|
| 4,663,709 | 5/1987 | Fujiwara et al. | 364/200 |
| 4,847,754 | 7/1989 | Obermarck et al. | |
| 5,047,919 | 9/1991 | Sterling et al. | |
| 5,109,511 | 4/1992 | Nitta et al. | |
| 5,226,143 | 7/1993 | Baird et al. | 395/425 |
| 5,230,070 | 7/1993 | Liu | 395/425 |
| 5,305,448 | 4/1994 | Insalaco et al. | 395/425 |
| 5,339,415 | 8/1994 | Strout, II et al. | 395/650 |
| 5,339,427 | 8/1994 | Elko et al. | 395/725 |
| 5,353,418 | 10/1994 | Nikhil et al. | 395/375 |
| 5,375,241 | 12/1994 | Walsh | 395/700 |

OTHER PUBLICATIONS

"Memory Protection Software Facility for OS/2 Shared Data Applications", IBM Technical Disclosure Bulletin, vol. 34, No. 4A, Sep. 1991, pp. 81–89.

Primary Examiner—Kevin A. Kriess
Assistant Examiner—Majid A. Banankhah
Attorney, Agent, or Firm—Robert M. Carwell

[57] ABSTRACT

Libraries for use in a multithreaded computer environment which must be thread-safe and cannot be recoded are identified. Such libraries, after identification, are repackaged. Export routines for such libraries will thereby acquire a front end which effects several steps. First a write-exclusive lock for a particular called function of one of the libraries is generically acquired. A call is then made to the underlying function whose name has been remapped. Upon return from the real routine, the write-exclusive lock is unlocked and a return to the user is executed. The system and method ensure correct functioning and integrity of the identified library functions accessible by multiple threads, as well as providing for creation of multithread-safe shared libraries without necessitating extensive library source modifications.

6 Claims, 4 Drawing Sheets

SYSTEM AND METHOD FOR CREATING THREAD-SAFE SHARED LIBRARIES

TECHNICAL FIELD

This invention relates to systems and methods for managing shared resources in a computer system, and, more particularly, to shared resource management techniques in multithread environments.

BACKGROUND OF THE INVENTION

In order to better understand the background of the subject invention, explanation of some of the terminology utilized hereinafter will first be provided. A term well known in the art as a symmetric multiprocessor (SMP) refers to an aspect of hardware in a computing system and, more particularly, relates to the physical layout and design of the processor planar itself. Such multiple processor units have, as one characteristic, the sharing of global memory as well as equal access to I/O in such a typical SMP system.

Yet another such term which will be hereinafter used and commonly associated with modern complex computing systems is a "thread". The term thread in a general sense refers merely to a simple execution path through application software and the kernel of an operating system executing with the computer. As is also well understood in the art, it is commonplace for multiple such threads to be allowed per a single process image.

Yet another concept which will be utilized hereinafter in describing the invention is one of "locks" or "mutexes". It is typical in modern computing systems to have critical sections of code or shared data structures such as in shared libraries whose integrity is extremely important to the correct operation of the system. Such locks/mutexes are devices employed in software (and hardware) to "serialize" access to these critical sections of code and/or shared data structures.

Two types of locks are typically encountered in the art, namely blocking locks and simple or "spin" locks. Blocking locks are of the form which cause a thread requesting the lock to cease being executable, e.g. to go to "sleep" as the term is employed in the art, if the lock is currently held by another thread. Spin locks, in contrast, do not put waiting threads to "sleep", but rather, the waiting threads execute a spin loop, and thus repeatedly continue to request the lock until it is freed by the current thread "owner". Blocking locks are typically used for large critical sections of code or if the operating system kernel must differentiate between threads requiring data structure read-only capability and threads requiring the capability to modify the data structure(s). This latter read-write type lock may be found implemented, for example, in the current OSF/1 operating system release of the Open Software Foundation (OSF).

One other term utilized hereinafter is the concept of code being multithread-safe. Such code is considered to be thread/MP-safe if multiple execution threads contending for the same resource or routine are serialized such that data integrity is ensured for all such threads. One way of effecting this is by means of the aforementioned locks.

In modern uniprocessor, single process model systems employing shared libraries, routines in such shared libraries do not require any form of hereinbefore noted serialization with respect to other routines in the library or multiple callers of the same routine. There is thus no problem with respect to shared or global data structures requiring use of locks or mutexes to prevent conception.

Moreover, even as between processes in multiprocessor systems, data corruption problems are typically avoided where private/local copies are data are maintained by the respective processes.

As a specific example of the foregoing, in version 3.2 of the AIX(tm) operating system of the IBM Corporation, shared libraries shipped for execution on compatible machines have to only run in a single process model on a uniprocessor system. Accordingly, there is no need for utilizing locks or mutexes to serialize access to shared or global data structures. However, in contrast, with respect to subsequent releases of the aforesaid operating system such as that employing Distributed Computing Environment (DCE) functionality, the process model has been changed from a single process to multiple threads per process. There are several benefits to this extension, not the least of which is concurrent programming.

However, such improvements in operating system technology have given rise to the problem addressed by the instant invention. With the advent of multithreaded systems, the requirement has arisen that the libraries associated therewith must be modified to either be thread-efficient or at the very least thread-safe. The added complexity of multiprocessor forms of such systems only exacerbates the problem of maintaining system integrity.

Applications which have been bound unshared with libraries do not require changes to the libraries inasmuch as they will maintain the single process model (e.g. a single thread, single process model). However, in other cases wherein the process model changes from a single thread single process to multiple threads per process, methods and systems were required to be devised which could render such libraries effectively thread-efficient or at least thread-safe. The practical constraint of programming resources simply renders it impractical to thread-safe all library routines in a modern multithreaded system. Thus, systems and methods were needed to enable the creation of multithread-safe shared libraries without the necessity for source code modifications of the library itself.

By way of further background, a typical multiprocessor environment with shared resource management may be seen described in U.S. Pat. No. 5,109,511 entitled "Shared Resource Managing Method and System". However, in this system no lock operations are provided for. In yet another reference, U.S. Pat. No. 4,847,754, there is disclosed another multiprocessor environment providing for serialization of access to shared resources among concurrent processes which does call for a lock mechanism. However the system provides for a two-step serialization process requiring an access initiation operation followed by an access completion operation.

Yet another shared resource system for concurrent processes in a multi-process environment may be seen in "Memory Protection Software Facility for OS/2 Shared Data Application", IBM Technical Disclosure Bulletin, Vol. 34, No. 4A, 9/91. This reference describes a technique for isolating memory areas in, for example, Intel 386 architected systems wherein a facility is provided for dynamic link libraries (DLLs) to protect their critical shared global data regions. However, no protection is provided for the DLLs from each other, the technique disclosed requires altered process address spaces, and, moreover, has undesirable hardware dependencies.

Several approaches to addressing the specific problem met by the subject invention are available, all of which include concomitant and very undesirable drawbacks.

As but one example, in seeking to effect multithreaded and multiprocessor shared libraries which are thread-safe, one approach is to simply rewrite all libraries to add locks. As a practical matter, a modern complex computing system may involve numerous such libraries. In the case of the aforesaid AIX system, there are in excess of 70 libraries including, for example, a socket library in excess of one megabyte. Obviously, to rewrite all such libraries would entail a resource commitment far in excess of that which is practical to maintain a commercially viable system.

Yet another approach is simply to do nothing with respect to the existing libraries in terms of rewriting code, but rather simply to document libraries which are not thread-safe. This approach obviously has serious drawbacks itself, not the least of which is maintaining the accuracy of such documentation and the impact on system integrity from errors in documentation.

From the foregoing it may be readily understood that lack of a system and method for creating thread-safe shared libraries has created serious problems with respect to modern complex computing environments, and thus a solution was sorely needed in the industry.

It is accordingly an object of the invention to provide systems and methods for creating thread-safe shared libraries; it is yet a further object of the invention to provide for such shared libraries and their usage without the necessity for source-code modifications of the library.

These and other objects have been fully met by the subject invention, a description of which hereinafter follows which may be more easily understood with reference to the following drawings wherein:

SUMMARY OF THE INVENTION

Figure 1:
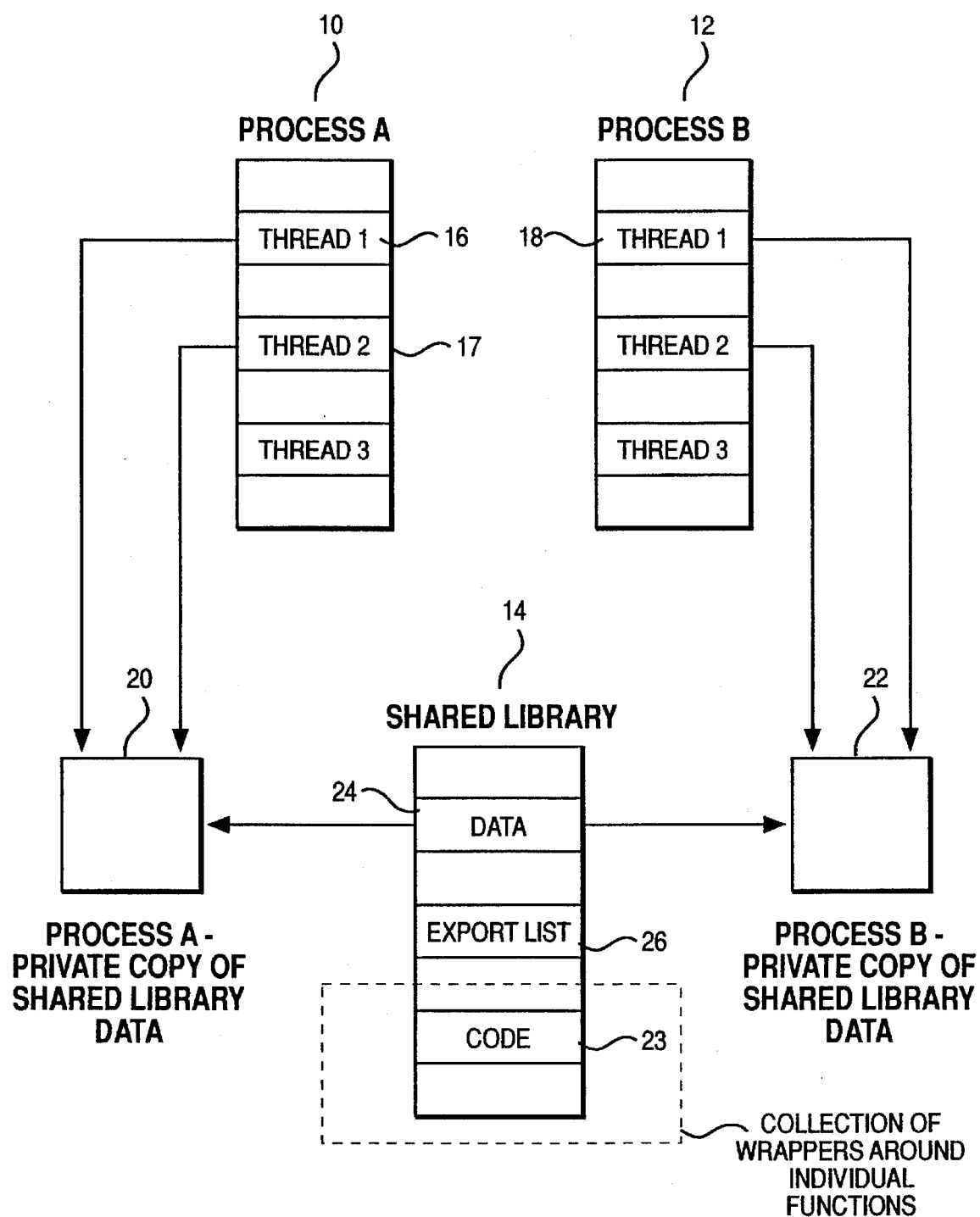
FIG. 1 is a schematic diagram of the structural components of a representative multithreaded computer system which may advantageously employ the computer system.

Libraries for use in a multithreaded computer environment which must be thread-safe and cannot be recoded are identified. Such libraries, after identification, are repackaged. Export routines for such libraries will thereby acquire a front end which effects several steps. First a write-exclusive lock for a particular called function of one of the libraries is generically acquired. A call is then made to the underlying function whose name has been remapped. Upon return from the real routine, the write-exclusive lock is unlocked and a return to the user is executed. The system and method ensure correct functioning and integrity of the identified library functions accessible by multiple threads, as well as providing for creation of multithread-safe shared libraries without necessitating extensive library source modifications.

In a preferred embodiment for generating thread-safe functions, shared library functions not to be modified are identified and an export list of external functions extracted. Function descriptors corresponding to each function are saved, and a wrapper generated for each function with a global lock and further having a corresponding one of the saved function descriptors. Modified function descriptors are created for each function descriptor, each having an address of a corresponding wrapper entry point. The table of contents to the shared library is modified so that a pointer is returned in response to a function call to the modified function descriptor rather than to the original function descriptor. The corresponding wrapper to which the modified function descriptor pointer points includes, in the copy of the function descriptor contained therein, a pointer to the same function as the original function descriptor. This pointer invokes a lock on the function, whereupon the function code executes and issues a return, whereupon the lock is released. The pointer in the copy of the function descriptor in the wrapper is identical to that of the original function descriptor.

Also in a preferred embodiment of the invention for invoking shared library functions in a thread-safe manner, a call is issued to execute a function of a shared library. A pointer is retrieved from a table of contents of the shared library in response to the function call pointing to a modified function descriptor. A pointer is retrieved from the modified function descriptor, in turn pointing to a wrapper corresponding to the function. The wrapper contains a substantial copy of the original function descriptor, and, in particular, includes the same pointer as the original function descriptor to the executable function code. Upon invoking the wrapper code, this pointer causes execution of a lock on the function and subsequent execution of the function itself. Upon return of the function, the wrapper code, in response, releases the lock and returns control for invocation of a next thread and corresponding function.

Wrappers are provided for each externalized function of the shared library whereby, in combination, they effect a wrapper around the executable shared library code. In this manner, due to the lock invoked when wrapper code corresponding to a given function is executed, the function is thereby made thread-safe. Data associated with the function thus may not be corrupted by a call by a subsequent thread, and the memory associated with the data is not released until the lock is released.

DETAILED DESCRIPTION OF THE PREFERRED EMBODIMENT

FIG. 1 depicts a multithread computer system with multiple processes sharing a shared library in accordance with the prior art. Accordingly, multiple processes A and B as shown are reference numerals 10, 12, respectively, and a shared library 14. It will be recalled from the foregoing that in single threaded process models of the prior art, corrupting library data was not a problem since a process would have its own copy of data, such as the copy of data 24 shown at reference numeral 20 or 22. A given process thus did not have access to the data 24 of the shared library 14 and only one thread, such as thread 1 shown at reference numeral 16 of process A, was permitted to access the copy 20 of the data at a given time.

In contrast, still referring to FIG. 1, in a multithread application such as that shown, if multiple such threads (such as threads 1 and 2 shown at reference numeral 16 and 17) are permitted to access the data 24 of the shared library 14 at the same time, corruption of the data will result. In systems such as those shown in FIG. 1, the multiple threads (such as threads 16 and 17 of one process such as process A, reference numeral 10), have access to their own copy 20 of the shared library data 24 but cannot access the shared library data 24 or the other process private copy 22 of the data corresponding to process B at reference numeral 12.

The conventional way to access data 24 in a shared library 14 is through routines or code 23 provided by the shared library 14. This code 23 will change shared library data 24 and generate pointers and the like thereby managing the data copies 20 and 24 with local and global variables, tables, hashing queues, and the like.

The multiple processes such as process A and B usually do not access the data 24, but rather go through the shared library routines of code 23, which duplicate the data 24 of the shared library and pass back information to respective processes based upon what the shared library code 23 did during such management. As noted, the data from the shared library must thus be unique per process, e.g. a pristine copy of the data 24 must be provided as in copies 20 and 22 to each respective process 10, 12, whereby the multiple processes and threads will not corrupt the data 24 of the shared library 14 itself. It will be noted, in passing, that in some cases, the routine or function call generated from the shared library code 23 will indicate that it is using a piece of data 24 for some working storage space. In these instances it will pass back an exact address of the data 24 in the shared library 14 to the calling thread from the particular process.

To illustrate the specific problem of data corruption which can arise from multithread processes such as those shown in FIG. 1, it will first be noted that it is typical for function calls from processes to a shared library 14 to utilize global data. An example of this is the well known printf function which will have a global data area wherein modifications are performed on a data stream which is desired to be printed out. It is important to note that conventionally only one such global data area for printf is provided per process. It will be readily apparent then, that if multiple threads 16, 17, for example, of a process A, reference numeral 10, call the same function, (e.g. printf) at the same time, each thread will be attempting to use the identical global data area, thereby corrupting it with the inputs of the differing threads resulting in invalid outputs.

Numerous solutions to the aforementioned problems have been attempted. One approach is to rewrite the entirety of the functions of a library such as the aforementioned printf as well as its corresponding underlying routines to be thread-safe. This entails allocating unique portions of data storage such as at reference numeral 20, so that when a thread 17 calls a given function, such as printf or malloc, the thread of the function will use a different section of memory than that employed by a prior thread calling the same function.

Yet another approach is to provide a lock on the global data area of the particular function such as printf or malloc. In summary then, there are differing ways to make library routines thread-safe such as providing locks, having the functions pass the data area, utilizing a unique data area, having the function lock and unlock a common data area and provide returns giving the status of the lock. However, all of these approaches require extra work and coding such as recoding the actual library functions as previously mentioned in a manner to render them thread-safe.

Thus, not only were such prior art attempts to solve the problem impractical in terms of the resources required for recoding, but further undesirable results occur from these approaches. For example, it is highly undesirable for end users to assume the responsibility of modifying library source inasmuch as such code changes can easily result in source compatibility problems. Requiring changes of code in the shared library 14 or applications (e.g. those invoking multiple processes such as process A and B) to fix the problem was highly undesirable, as it is much more preferable to facilitate the continued use of existing libraries and avoiding the necessity of code changes.

Figure 2:
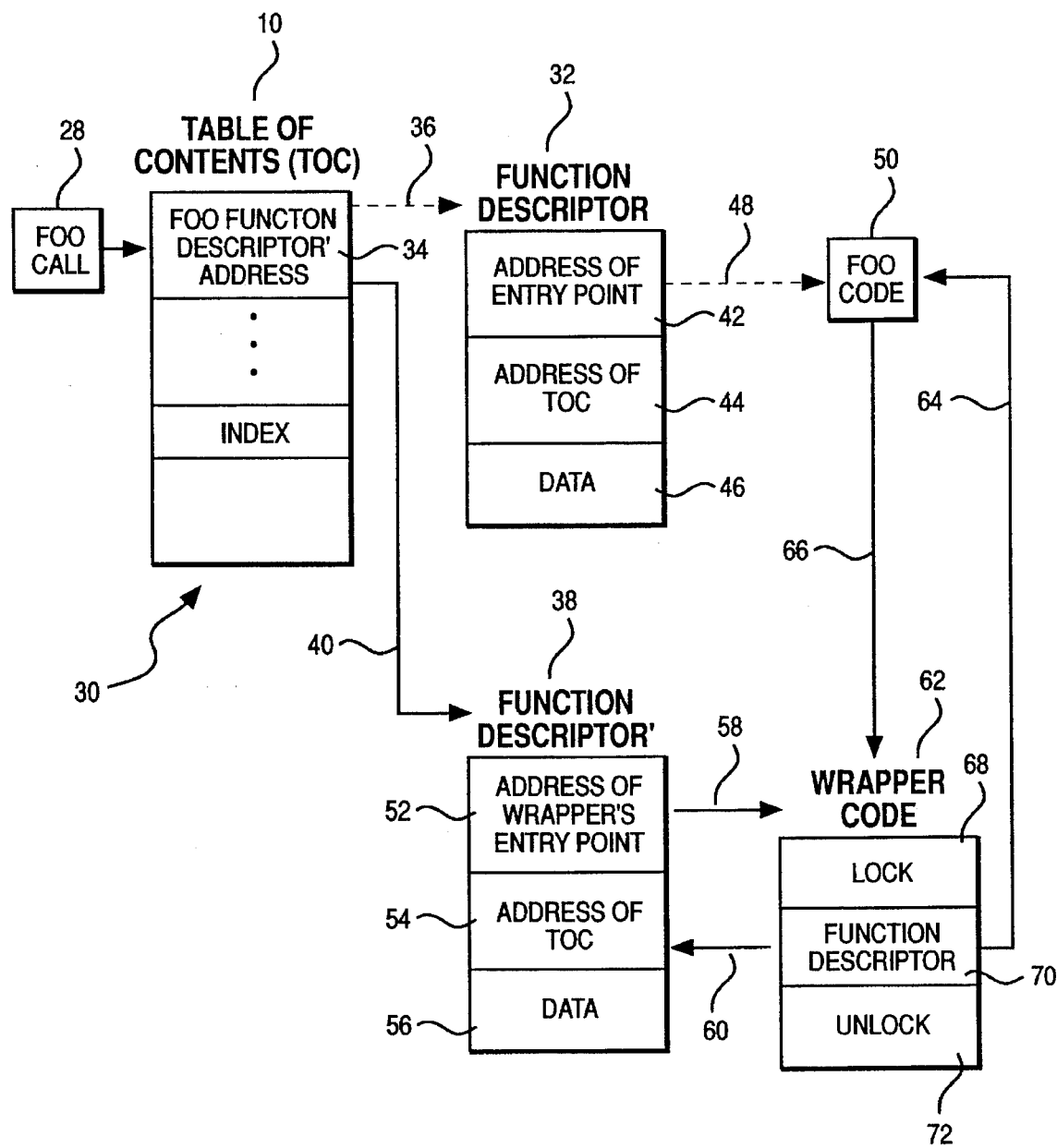
FIG. 2 is a more detailed illustration of a portion of the system of FIG. 1, depicting aspects of the shared resource components of FIG. 1.

Turning to FIG. 2 now, a description will be provided of the system and method of the invention for solving the aforementioned problems. The solution essentially entails placing a wrapper around the code 23 of the shared library 14 (rather than the data 24) in a manner to be detailed.

Library functions in a given shared library have corresponding routines and function names which the given shared library "exports", i.e. which are available to an end user or application to call. A representative such export list for shared library 14 is shown at reference numeral 26 of FIG. 1. It is conventional that when applications are built, the application is able to locate a symbol in corresponding function code of a given shared library because of the export list 26 providing the information of what the external function calls are which are available outside the shared library for use by an application. An example of such an entry in the export list would be the aforementioned printf or malloc external interface function names. More particularly, it is conventional to have a library file such as lib.exp as part of the shared library which is simply an ASCII file or string of all symbols exported from the shared library (such as malloc, free, printf . . . ).

The concept of the invention entails, in part, employing this export list of all exported function names from a given library and placing "wrappers" around each such function. A wrapper is simply code extending around the instantiation of the call of the given corresponding function. If, for example, a thread calls a malloc function, in providing a "wrapper" for the particular function, this simply means placing another malloc (e.g. the wrapper) on top of the pre-existing function call such as malloc and renaming the underlying one. Thus, when a user or thread calls a function such as malloc, the wrapped underlying version of malloc is called from the wrapper on top of the renamed underlying version. The underlying version will then obtain a lock, which in turn recalls the underlying malloc function to do the real memory allocation function of the malloc function, The actual real malloc function then returns back to the wrapper which completes the wrappered functions necessary to complete the desired action, such as unlocking the lock, freeing data, and the like. Thus, a wrapper will be seen to be an individual piece of code placed around a corresponding individual function call or routine which is exported from the shared library.

By doing so, the invention thereby protects all the function calls within the shared library from each other (e.g. separate calls to different functions from different multiple threads attempting to use the same data area) and further protects the calls from themselves (e.g. multiple calls from multiple threads to the same function such as printf, attempting to use again, the same data area for both such calls).

The aforementioned locks associated with the individual wrappers for each function will in actuality be the same global lock which each function will sequentially obtain at a given time upon execution of its corresponding wrapper code. For example, since a system does not know what given library routines are using for their global data areas and what memory they are accessing, this global lock will prevent malloc from potentially overriding or otherwise corrupting the data area currently being employed by printf inasmuch as printf will acquire the lock, thus locking out malloc from corrupting that area until printf frees the lock. Thus it will be seen that all wrappers will obtain the same lock providing for relatively coarse serialization but nevertheless effecting the objects of the invention in preventing data corruption.

From the foregoing, it is apparent that when wrapper code for a given function is invoked, the same lock will be locked no matter what the routine is that is being called through the particular wrapper function. In response, after effecting the lock, the real code of the routine will then be called and executed, whereupon after a return is received from the routine, the wrapper's lock is unlocked, thereby freeing the data area for use by a call from a subsequent thread.

When a wrapper around each of the externalized functions of the given shared library has thus been provided, the library may thus be thought of as being thread-safe by means of this collection of wrappers. It will be recalled that there are instances wherein the actual library functions themselves simply cannot be recoded individually to provide a similar thread-safe characteristic. For example, an end user may have received an application shipped with a prior version of an operating system who now wants to run the application on a new version of the operating system but does not have access to the source code, does not want to repurchase it or have the vendor re-port it. In other words, in such instances the end user, even if he otherwise had the resources to recode the functions, could not do so without access to the source to recode the shared libraries or application. The user would thus lave a problem in assuring thread-safe operation unless the vendor could be persuaded to either ship a thread-safe version of the shared library or to otherwise permit the end user to effect this through recoding (which can be prohibitively expensive as well as giving rise to source incompatibilities as previously noted).

In accordance with the invention, by provision for the aforesaid wrappers, there is, in a limited sense, a necessity to nevertheless modify the shared library code. However an important distinction is to note that in accordance with the invention, the internal functions (binary or source code) need not themselves be recoded or altered. Thus the reshaping or modification of the shared library may be thought of as actually essentially occurring on top of or on the outer portion of the shared library, giving rise to the notion of a collection of "wrappers" around the code 23 of FIG. 1. In essence, then, it will be seen that the "old" binary of the shared library prior to rendering it thread-safe in accordance with the invention may be saved off. This is because the changes entailed by the invention are beyond the binary image of the library and are effected by adding wrappers around the individual routines in the rebuilding of the library. The invention only modifies the entry points to the shared library to now point to the wrappers, without necessitating modifying the internal function calls and function code as was the case in the prior art.

The initial build of the shared library will include creation of the aforementioned export list 26. In accordance with the invention, then, this export list is then extracted from the shared library, yielding a list of all the exported symbols, e.g. externalizing function call names in the shared library. They are then essentially renamed whereby an identical function either before or after modifications in accordance with invention will nevertheless be executed by the same call. The identical function name will essentially invoke a pointer in a table of contents not to the old function descriptor existing prior to the modifications of the invention, but rather to a new function descriptor which, in turn, contains a pointer to the wrapper code corresponding to the function thus called.

Turning now to FIG. 2, an explanation will be provided of the functional blocks depicted therein implementing the invention.

First it will be recalled that the export list 26 of FIG. 1 has been previously generated as a part of the prior shared library and is extracted therefrom. It is conventionally simply in ASCII format inside the shared library, and the extraction comprises locating it in the memory of the shared library, e.g. where all the names of exported functions corresponding to the shared library exist (e.g. those externalized by the library and accessible by the user).

Once this export list of externalized function calls has been obtained, they are renamed through the process of adding and building new wrapper modules with corresponding names from the export list. These modules are thence placed back in the existing library in a manner to be described.

With continued reference to FIG. 2, each function such as "foo" in a given library has an associated function call 28 with a corresponding associated entry point in a table of contents 30. This is essentially a pointer or address of an entry point, e.g. in the example under consideration a descriptor address 34 of the foo function which points to a function descriptor 32. The function descriptor, in conventional operation, contains the address of the entry point, 42, of the corresponding function or routine, e.g. the foo code 50. In this manner, accessing the function descriptor 32 by means of the foo call 28 will cause a pointer 48 to be invoked to the foo code 50 whereupon the desired library routine or foo code will execute. The function descriptor 32 will also, conventionally, contain the address and memory, 44, of the table of contents 30, as well as data 46. Typically, also, one such table of contents 30 exists per shared library 14. In essence, in order to rename the function as previously described, this simply entails changing the symbol and storing off the function pointer. More particularly, a new function descriptor 38 is created, and the descriptor address 34 of the table of contents 30 is modified to point to this new function descriptor as shown by the arrow 40. Thus, in response to a function call 28, the table of contents 30, and, more particularly, the particular function's descriptor address 34, will now cause a pointing to the new or modified function descriptor 38 shown by arrow 40, rather than to the prior function descriptor 32 shown by the dotted arrow 36. In other words, the entry point of this new or modified function descriptor 38 is actually what is replaced into the address 34 of the table of contents in place of that or the prior function descriptor 32.

Continuing with FIG. 2, this new function descriptor 38, in comparison with the function descriptor 32, will be seen to be essentially a copy of the prior function descriptor 32, containing the same address of table of contents 54, and data 56. However, the significant difference between the two descriptors is that in the case of the address of the entry point, whereas the address or re-entry point 42 of the function descriptor 32 pointed to the actual routine code 50, the address of the modified function descriptor 38 shown at reference numeral 52 is now modified to be the address of the wrapper's entry point for the wrapper code 62. Thus, in response to the function call 28, the function descriptor 38 is invoked, whereupon the address of the wrapper's entry point 52 is, in turn, utilized to effect the pointer 58 to wrapper code 62.

Continuing with FIG. 2, the wrapper code 62 for each function 28 will include code necessary to invoke the locking and unlocking of the previously described global lock, shown in the wrapper code as lock 68 and unlock 72. When the wrapper code 62 is invoked by use of the pointer 58, the lock is locked by means of the execution of the lock code 68, whereupon the function descriptor 70 of the wrapper code 62 is employed. It is important to note that this function descriptor 70 is essentially identical to that of the prior function descriptor 32. More particularly and more importantly, however, the address of the entry point 42 in the function descriptor 32 is identical to that of the function descriptor 70. This will cause a pointing (schematically shown by pointer 64) to the actual executable code of the library routine such as foo code 50 in the identical manner that the address of the entry point 42 of the function descriptor 32, by means of the pointer 48, also caused execution of such library routine code 50 prior to provision of the function descriptor 38 and wrapper code 62.

When the foo code 50 completes executing, a return (shown as reference numeral 66) to the wrapper code 62 thereafter causes invocation of unlock code 72 to free the lock on the address space previously being utilized by execution of the particular library function. After this unlocking, this effects a return 60 to, ultimately, permit a function call by a next thread wherein the previous process is repeated. When the next call from a next thread sequentially is presented, in like manner, it will result in a pointer from the table of contents 30 to its corresponding function descriptor (which will differ for each of the functions in the library), in which case the previously described functions will again be replicated to cause execution of the actual library routine corresponding to this new function call from the next thread.

In summary, then, it is a significant feature of the invention to provide for new creation of these function descriptors 38, each corresponding to a function descriptor 32. Each prior function descriptor 32 is saved off for use in the wrapper code module 62 (as shown by function descriptor 70), wherein each wrapper code module corresponds to one of the function descriptors 32, a corresponding one of the function descriptors 38, and a corresponding function in the shared library. The table of contents 30 is modified and, more particularly, the function's entry in the table of contents is modified to now point to the new function descriptor 38.

When the user binds the new library, the table of contents is modified to call ultimately these wrapper routines (represented by wrapper code 62) and not the "old" or prior function descriptor 32 and routine code. If the latter were to happen, it will be readily apparent that the library function 50 would not be thread-safe inasmuch as no lock would have been provided. A subsequent function call from a next thread could then destroy data integrity. However, in accordance with the invention, the wrapper code 62 causes obtaining of the lock and calling of the actual underlying function previously in the library which is thus protected.

Rebuilding of the prior shared library essentially entails, in addition to creating the new function descriptors 38 and wrapper code 62, modifying the table of contents 30 to point to these new functions descriptors 38. Also, the "renaming" of the old modules (such as foo code 50) really simply entails changing how they are accessed. Now, they are accessed actually by invoking the wrapper code 62. It will be appreciated from the foregoing that path length has thus been increased arising from the addition of the wrapper code 62, the lock and unlock functions, and the extra function call (e.g. calling of the renamed function and the calling of the actual function itself). However, the effecting of a thread-safe shared library has thus nevertheless been implemented affording the other benefits not present in prior art approaches.

Figure 3:
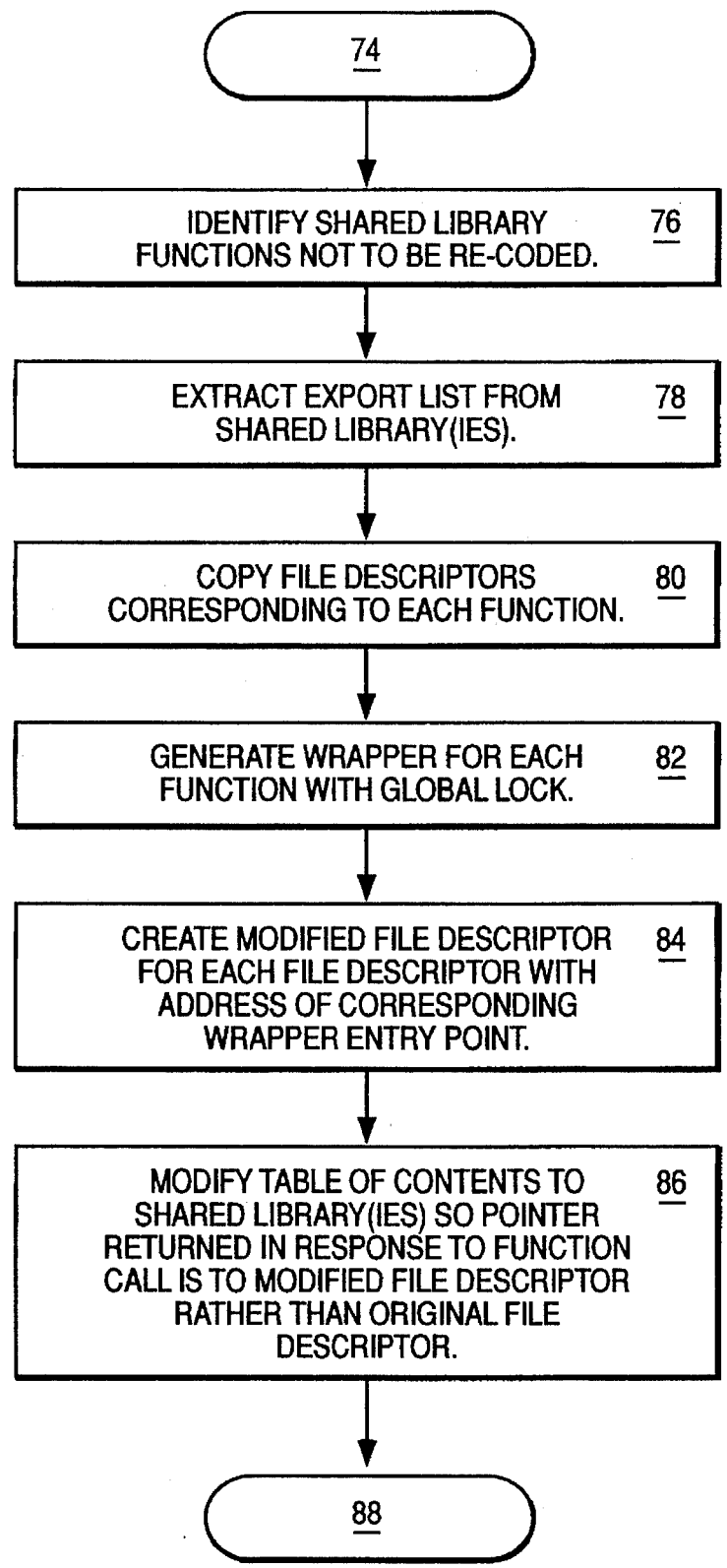
FIG. 3 is a flow diagram illustrating the method for creating thread-safe libraries in accordance with the invention.

Referring now to FIG. 3, a flow diagram is shown illustrating the steps of creating the thread-safe library. The process is entered at 74, whereupon shared library functions which are not to be re-coded are identified, 76. From the shared library or libraries, an export list is extracted listing all the symbols of the corresponding functions in the given library or libraries which are not to be recoded. Once this export list has been extracted, 78, the prior function descriptors corresponding to each function are saved off, 80. Next a wrapper is generated for each such function which will activate and deactivate a global lock, 82. A modified function descriptor for each prior function descriptor is constructed with an address or pointer to a corresponding wrapper entry point for the wrapper generated at reference numeral 82. This step of creating the modified function descriptors is shown at reference numeral 84. The table of content(s) is then modified to the shared library or libraries so that a pointer is now returned, in response to a given function call, to a corresponding modified function descriptor rather than the original function descriptor.

Figure 4:
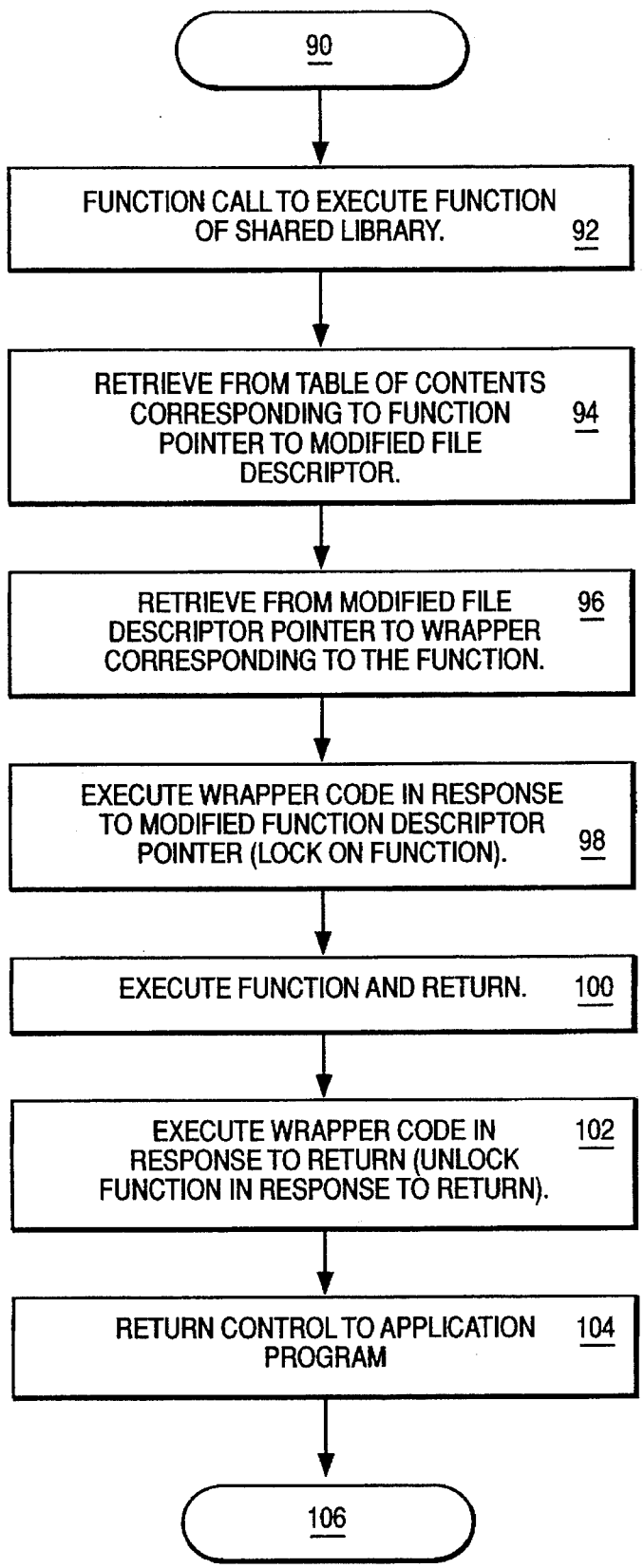
FIG. 4 is a flow diagram illustrating the thread-safe usage of shared libraries in accordance with the invention.

Referring now to FIG. 4, a simplified flow diagram is shown of the sequence of operation in accordance with the invention whereby a function from a multithread process is invoked (whereby the corresponding library routine is executed in a thread-safe manner in accordance with the invention). The sequence is entered at 90 whereupon a function call is issued to execute a function in the shared library, 92. In response to this call, a pointer to a modified function descriptor is retrieved from the table of contents of the shared library corresponding to the function thus-called, 94. A pointer is thereafter retrieved from the modified function descriptor to a wrapper corresponding to the function in the modified function descriptor, 96.

The wrapper code is thence executed as a result of obtaining this pointer, e.g. in response to the modified function descriptor pointer, whereupon a lock is obtained on the function which is desired to be executed, 98. The particular function thereafter executes whereby, as a result of the lock, data corruption is avoided by calls from any thread occurring after the one which invoked the function's execution, shown at reference numeral 100. Upon return of the function, wrapper code executes in response to the return to thereby unlock the global lock which locked the function, 102. After the lock has been released, return of control is provided to the application program to permit execution of a subsequent call caused by a next thread, 104, whereupon the previously described sequence of events has thus been terminated, 106.

While the invention has been shown and described with reference to particular embodiments thereof, it will be understood by those skilled in the art that the foregoing and other changes in form and detail may be made therein without departing from the spirit and scope of the invention.

What is claimed is:

1. A method for use in a multithread computer system employing a pre-existing shared library having a pre-existing function descriptor, a pointer to said function descriptor and a corresponding at least one function which is not multithread-safe when used in said system having a corresponding underlying call associated therewith exported from said library to render said shared library multithread-safe when used in said system, comprising:

creating a wrapper for said function comprised of program code extending around instantiation of said underlying call said wrapper being responsive to a call corresponding to said underlying call, said creating including the steps of storing said pre-existing function descriptor therewithin, and creating a lock to said function; and rebinding said pre-existing shared library with said wrapper including the steps of creating a modified function descriptor including creating a pointer to said wrapper and creating a copy of said function descriptor with said pointer to said wrapper in said modified function descriptor being substituted for said pointer to said function in said function descriptor during said rebinding; and substituting a pointer to said modified pointer descriptor for said pointer to said function descriptor.

2. The method of claim 1 wherein calling said function before and after said rebinding invokes said pointer to said function descriptor and said pointer to said modified function descriptor, respectively.

3. The method of claim 2 wherein said function descriptor includes a pointer to a routine corresponding to said function.

4. A method for modifying a multithread shared library computer system in which an underlying function call exported from said shared library invokes a pointer to a function descriptor which, in turn, invokes a pointer to a corresponding routine of said shared library thereby causing execution of said routine, whereby multithread safe use of said shared library is facilitated said method comprising:

providing a wrapper including a lock being comprised of program code extending around instantiation of said underlying function call, said wrapper being responsive to a call corresponding to said underlying call and including a lock for said routine, said wrapper further including said function descriptor;

providing a substitute function descriptor with a pointer to said wrapper;

changing said pointer to said function descriptor into a pointer to said substitute function descriptor;

invoking said pointer to said substitute function descriptor;

invoking with said pointer to said substitute function descriptor said pointer to said wrapper; and invoking with said pointer to said wrapper execution of said wrapper including executing said routine from said function call sequentially through said substitute function descriptor and then through said wrapper including said function descriptor;

executing a lock on said routine;

invoking said pointer of said function descriptor in said wrapper to said routine thereby causing its execution; and unlocking said lock on said routine in response to a return to said wrapper from said routine.

5. The method of claim 4 wherein said lock and said unlocking precludes and permits, respectively, execution of said routine from a subsequent said function call from another of said multiple threads while said routine is executing.

6. A system for use in a multithread computer system employing a pre-existing shared library having a pre-existing function descriptor, a pointer to said function descriptor, and a corresponding at least one function which is not multithread-safe when used in said system having a corresponding underlying call associated therewith exported from said library to render said shared library multithread-safe when used in said system, comprising:

means for creating a wrapper for said function comprised of program code extending around instantiation of said underlying call, said wrapper being responsive to a call corresponding to said underlying call, said means for creating a wrapper further including means for storing said pre-existing function descriptor therewithin; and means for creating a lock to said function; and means for rebinding said pre-existing shared library with said wrapper said means for rebinding including means for creating a modified function descriptor including means for creating a pointer to said wrapper and means for creating a copy of said function descriptor with said pointer to said wrapper in said modified function descriptor, being substituted for said pointer to said function in said function descriptor during said rebinding; and means for substituting a pointer to said modified pointer descriptor for said pointer to said function descriptor.

\* \* \* \* \*